United States Patent Office 2,982,607
Patented May 2, 1961

2,982,607

LANTHANUM MANGANESE HEXAFERRITES

Victor L. Moruzzi and Bertram A. Calhoun, Poughkeepsie, N.Y., assignors to International Business Machines Corporation, New York, N.Y., a corporation of New York No Drawing. Filed Nov. 6, 1958, Ser. No. 772,174

4 Claims. (Cl. 23—51)

This invention relates to ferromagnetic materials and, more particularly, to permanent magnetic compositions exhibiting useful magnetic properties.

While permanent ferromagnetic oxides with hexagonal magnetoplumbite structures have been described previously, these materials are characterized by a very high magnetocrystalline anisotropy and high coercive forces. While these magnetic properties, in particular, the high coercive forces, appear to be highly desirable for application in magnetic record members, such as magnetic tapes, used as memory storage elements, the minimum coercive force of any of these compounds exceeds the upper limit of the useful range for such members. Therefore, it is desirable to provide permanent magnetic materials having coercive forces within the useful range for application in magnetic tapes, or about 300–1000 oersteds.

Accordingly, an object of this invention is to provide magnetic materials which have more desirable magnetic properties for use in magnetic record members.

A more specific object of this objection is to provide permanent magnetic materials, and particularly lanthanum manganese hexaferrites, having coercive forces within the range suitable for use in magnetic tapes.

Other objects will be pointed out in the following description and claims which disclose, by way of example, the principle of the invention and the best mode, which has been contemplated, of applying that principle.

As a result of a phase investigation, the system $MFe_{12}O_{19}$, where M represents a trivalent ion, such as lanthanum, was discovered. It was found that the iron ion in such a system exists both in the ferrous and ferric oxidation states. The structural formula thus may be represented as $La_2O_3 \cdot 2FeO \cdot 11Fe_2O_3$. The iron ion in such compounds as $BaFe_{12}O_{19}$ on the other hand, exists only in the ferric state. This difference enables chemical substitution in such compounds as $LaFe_{12}O_{19}$ for ferrous iron as well as for ferric and lanthanum ions. Such substitutions provide means whereby selective alteration of the magnetic characteristics of the base system may be achieved. In particular, substitution for ferrous ion provides materials having coercive forces in the range desired for application in magnetic tapes. Particularly good results are achieved by incorporating manganese into the system for at least a portion of the ferrous ion.

The magnetic materials of the present invention may be conveniently prepared by forming an intimate mixture of ferric oxide, lanthanum oxide, and manganese oxide in pre-determined proportions, and sintering the mixture at elevated temperatures, preferably within the range 1300°–1400° C., in a suitable atmosphere, such as air, $O_2$ or $CO_2$ and for a period of time sufficient to form the hexagonal hexaferrite, usually over 20 hours.

Following the procedure described above, 1.37 grams $La_2.O_3$, 0.66 gram $Mn_3O_4$, and 7.38 grams $Fe_2O_3$, corresponding to the formula $LaMnFe_{11}O_{19}$, were intimately mixed and fired at 1350° C. for 100 hours in an oxygen atmosphere to produce a fine grained material having a particle size of about 15 microns in diameter. This magnetic material exhibited a coercive force of about 600 oersteds, measured using unoriented bulk samples, a Curie temperature of 410° C. and a first order anisotropy constant, $K_1$, of $2\times10^6$ ergs per cc.

The discovery of this new magnetic system enables the preparation of magnetic recording media, such as magnetic tapes, having more desirable properties than have hitherto been obtainable with other available materials. Other substitutions of divalent manganese for ferrous ion in the lanthanum manganese hexaferrite system may be made to provide a number of equivalent magnetic compounds with different coercive forces. For example, $$LaMn_{0.5}Fe_{11.5}O_{19}$$

has a coercive force of about 700 oersteds.

While there have been shown and described and pointed out the fundamental novel features of the invention as applied to a preferred formulation of the lanthanum manganese hexaferrite system, it will be understood that various substitutions and changes may be made by those skilled in the art without departing from the spirit of the invention. It is the intention therefore, to be limited only as indicated by the scope of the following claims.

What is claimed is:

1. $LaMnFe_{11}O_{19}$.

2. A permanent magnetic material consisting essentially of a sintered mass of crystals of $LaMnFe_{11}O_{19}$ which exhibits a coercive force of about 600 oersteds.

3. A method of preparing a permanent magnet consisting essentially of a sintered mass of crystals of lanthanum manganese hexaferrite comprising providing a mixture of 1.37 grams lanthanum oxide, 7.38 grams ferric oxide and 0.66 gram manganese oxide, and sintering the thus prepared mixture at a temperature of about 1300°–1400° C.

4. A method of preparing a permanent magnet consisting essentially of a sintered mass of crystals having the formula $LaMnFe_{11}O_{19}$ comprising providing a mixture of 1.37 grams $La_2O_3$, 7.38 grams $Fe_2O_3$, and 0.66 gram $Mn_3O_4$ and sintering the thus prepared mixture at a temperature of about 1350° C. for 100 hours in an oxygen atmosphere to form thereby a fine grain magnetic material having a particle size of about 15 microns in diameter.

References Cited in the file of this patent

UNITED STATES PATENTS 2,677,663 Jonker et al. ------------- May 4, 1954